US011858821B2

(12) United States Patent
Hahn et al.

(10) Patent No.: US 11,858,821 B2
(45) Date of Patent: Jan. 2, 2024

(54) METHOD OF SILICA PRETREATMENT

(71) Applicant: THE GOODYEAR TIRE & RUBBER COMPANY, Akron, OH (US)

(72) Inventors: Bruce Raymond Hahn, Hudson, OH (US); George Jim Papakonstantopoulos, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/545,155

(22) Filed: Dec. 8, 2021

(65) Prior Publication Data
US 2022/0204351 A1 Jun. 30, 2022

Related U.S. Application Data

(60) Provisional application No. 63/131,713, filed on Dec. 29, 2020.

(51) Int. Cl.
*C01B 33/18* (2006.01)
*B01J 31/02* (2006.01)

(52) U.S. Cl.
CPC ............ *C01B 33/18* (2013.01); *B01J 31/0211* (2013.01)

(58) Field of Classification Search
CPC ........ C01B 33/18; B01J 31/0211; B60C 1/00; B60C 1/0016; C08K 5/548; C08K 3/36; C08K 9/06; C08K 7/26; C09C 1/3081; C08L 15/00
See application file for complete search history.

(56) References Cited

U.S. PATENT DOCUMENTS

| | | | |
|---|---|---|---|
| 3,842,111 A | 10/1974 | Meyer-Simon et al. | |
| 3,873,489 A * | 3/1975 | Thurn | B82Y 30/00 524/552 |
| 3,978,103 A | 8/1976 | Meyer-Simon et al. | |
| 5,405,985 A | 4/1995 | Parker et al. | |
| 5,468,893 A | 11/1995 | Parker et al. | |
| 5,663,396 A | 9/1997 | Musleve et al. | |
| 5,908,660 A * | 6/1999 | Griffith | C09C 1/3081 106/490 |
| 6,172,251 B1 | 1/2001 | Parker | |
| 6,294,683 B1 | 9/2001 | Johnson et al. | |
| 7,687,107 B2 | 3/2010 | Okel et al. | |
| 7,704,552 B2 | 4/2010 | Okel et al. | |
| 9,834,684 B2 * | 12/2017 | Wang | C09C 1/30 |
| 2002/0022085 A1 * | 2/2002 | Thise | C09C 1/3081 427/215 |
| 2005/0131107 A1 | 6/2005 | Okel | |
| 2008/0242762 A1 * | 10/2008 | Ramakrishnan | C09D 183/04 525/477 |

FOREIGN PATENT DOCUMENTS

| | | | | |
|---|---|---|---|---|
| WO | 0114480 A1 | 3/2001 | | |
| WO | 0121715 A1 | 3/2001 | | |
| WO | WO2001014480 A1 * | 3/2001 | | C09C 1/30 |

OTHER PUBLICATIONS

Extended European Search Report dated Jun. 21, 2022 for European Patent Application No. 21212812.8 which is the European counterpart to the subject patent application.

* cited by examiner

*Primary Examiner* — Anthony J Zimmer
*Assistant Examiner* — Jordan W Taylor
(74) *Attorney, Agent, or Firm* — Alvin T. Rockhill

(57) ABSTRACT

The subject invention discloses an improved method for making pre-hydrophobated precipitated silica from rice hull ash silica. This process is renewable, highly efficient, and incorporates virtually all of the silica coupling agent used in making the pre-hydrophobated precipitated silica into the final product. The subject invention more specifically reveals a method for making pre-hydrophobated precipitated silica comprising: (1) dispersing silica into water under conditions of agitation to made an aqueous silica slurry; (2) adding a phase transfer agent to the aqueous silica slurry; (3) adding a silica coupling agent to the aqueous silica slurry; (4) maintaining the aqueous slurry at a temperature of at least 20° C. for a time which is sufficient for the silica coupling agent to react with the silica to produce the pre-hydrophobated precipitated silica; and (5) recovering the pre-hydrophobated precipitated silica from the aqueous silica slurry.

20 Claims, No Drawings

METHOD OF SILICA PRETREATMENT

This application claims benefit of U.S. Provisional Patent Application Ser. No. 63/131,713, filed on Dec. 29, 2020. The teachings of U.S. Provisional Patent Application Ser. No. 63/131,713 are incorporated herein by reference in their entirety.

BACKGROUND OF THE INVENTION

Rubber compositions often contain a filler, such as carbon black or silica, to attain desired physical properties. For instance, the rubber compositions used in tires, hoses, power transmission belts, conveyor belts, and a wide variety of other rubber products, normally contain one or more fillers. Carbon black has traditionally been used as a filler in manufacturing such rubber products. However, there is a growing trend toward utilizing silica or a combination of silica and carbon black in tire rubbers, such as tire tread formulations, to attain improved physical properties, such as wet traction characteristics and tread life without sacrificing rolling resistance (fuel economy).

A silica coupling agent is normally employed in rubber compounds that utilize silica as a filler in order to attain better compatibility with the rubber and more optimal physical characteristics. Various sulfur containing organosilicon compounds are useful as reactive silica coupling agents. The use of such organosilicon compounds in silica containing rubbers improves physical properties by coupling the silica filler to the rubber. It should be noted that certain of these organosilicon compounds are also useful as adhesion primers for glass, metals and other substrates.

U.S. Pat. Nos. 3,842,111, 3,873,489 and 3,978,103 disclose the preparation of various sulfur containing organosilicon compounds. These organosilicon compounds are prepared by reacting (1) 2 moles of a compound of the formula Z-Alk-X, wherein X is a halogen selected from the group consisting of chlorine, bromine or iodine; wherein Z represents:

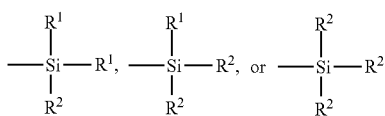

wherein $R^1$ is an alkyl group containing from 1 to 4 carbon atoms or a phenyl group and wherein $R^2$ is an alkoxy group containing from 1 to 8 carbon atoms, a cycloalkoxy group containing from 5 to 8 carbon atoms or an alkylmercapto group containing from 1 to 8 carbon atoms, wherein Alk is a divalent aliphatic hydrocarbon, an unsaturated hydrocarbon or a cyclic hydrocarbon containing 1 to 18 carbon atoms; with (2) 1 mole of a compound of the formula $M_2S_n$, wherein M is an ammonium group or a metal atom and n is a whole number from 2 to 6. Since the two starting materials are liquid, the reaction can take place in the absence of a solvent; however, the utilization of a volatile inert organic solvent is preferred and accordingly such an inert organic solvent is generally used. The reaction is carried out with the exclusion of water. The reason for the exclusion of water is to avoid the alkaline hydrolysis reaction of the silyl alkoxy groups which will ultimately lead to insoluble polymeric by-products and lower the overall yield of desired product. Aliphatic alcohols, such as methanol, ethanol, iso-propyl alcohol, normal-propyl alcohol, n-butanol, iso-butanol and t-butyl alcohol are representative examples of suitable inert organic solvents. At the end of the reaction between the two starting materials, the separated salt is removed by filtration. The filtrate is then freed from the solvent by distillation under vacuum. Unfortunately, this process is difficult to carry out on a commercial basis for a variety of reasons. For instance, most alcohols that are suitable for utilization as the solvent are difficult to obtain and maintain in a water-free (anhydrous) state. Additionally, most suitable alcohols, such as ethyl alcohol, have a low flash point which is highly undesirable in commercial applications.

U.S. Pat. No. 5,405,985 relates to a process for the production of organosilicon compounds of the formula: Z-Alk-Sn-Alk-Z. wherein Z is selected from the group consisting of

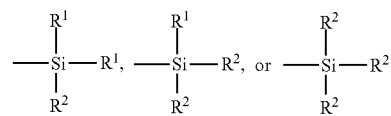

wherein $R^1$ is an alkyl group of 1 to 4 carbon atoms, a cyclohexyl group, or a phenyl group; wherein $R^2$ is an alkoxy group containing from 1 to 8 carbon atoms or cycloalkoxy containing from 5 to 8 carbon atoms; wherein Alk represents a divalent hydrocarbon of 1 to 18 carbon atoms, and wherein n is an integer of 2 to 8; comprising reacting (A) a compound of the formula: Z-Alk-X, wherein X represents Cl, Br or I; with (B) a compound of the formula: $Me_2S_n$, wherein where Me is an ammonium ion or an alkali metal ion; and wherein the reaction is conducted in the presence of a phase transfer catalyst and an aqueous phase.

U.S. Pat. No. 5,468,893 relates to a process for the production of organosilicon compounds of the formula: Z-Alk-Sn-Alk-Z. wherein Z is selected from the group consisting of:

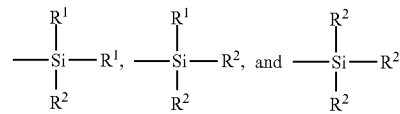

wherein $R^1$ is an alkyl group containing 1 to 4 carbon atoms, a cyclohexyl group, or a phenyl group; wherein $R^2$ is an alkoxy group containing from 1 to 8 carbon atoms or cycloalkoxy group containing from 5 to 8 carbon atoms; wherein Alk is a divalent hydrocarbon containing from 1 to 18 carbon atoms, and n is an integer of 2 to 8; comprising reacting (A) a compound of the formula Z-Alk-X, wherein X is Cl, Br or I; with (B) a compound of the formula $Me_2S_n$, wherein Me is ammonium or an alkali metal; and wherein the reaction is conducted in the presence of a phase transfer catalyst, an aqueous phase and a salt of the formula: XY or $X_2SO_4$, wherein X is selected from the group consisting of Li, Na, K, Rb and Cs; and wherein Y is selected from the group consisting of F, Cl and Br.

U.S. Pat. No. 5,663,396 relates to a process for the production of organosilicon compounds of the formula: Z-Alk-Sn-Alk-Z. wherein Z is selected from the group consisting of:

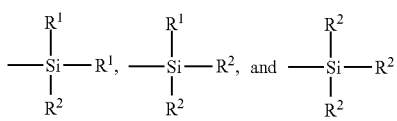

wherein R¹ is an alkyl group containing 1 to 4 carbon atoms, a cyclohexyl group, or a phenyl group; wherein R² is an alkoxy group containing from 1 to 8 carbon atoms or cycloalkoxy group containing from 5 to 8 carbon atoms; wherein Alk is a divalent hydrocarbon containing from 1 to 18 carbon atoms, and n is an integer of 2 to 8; comprising (A) reacting sodium hydroxide with sulfur in the presence of a saturated NaCl aqueous solution to form a reaction mixture; and (B) reacting said reaction mixture with a compound of the formula: Z-Alk-X, wherein X is Cl or Br, in the presence of a phase transfer catalyst.

U.S. Pat. Nos. 6,172,251 and 6,294,683 disclose a technique for reacting a first liquid chemical compound with a second liquid chemical compound which comprises (1) supporting the first liquid chemical compound on a solid support; (2) subsequently bringing the solid support into contact with the second liquid chemical compound; and (3) allowing the first chemical compound to react with the second chemical compound in the presence of a phase transfer catalyst to produce a reaction product. This technique is particularly useful in the synthesis of sulfur containing organosilicon compounds of the formula Z-Alk-S$_n$-Alk-Z, wherein Z is selected from the group consisting of

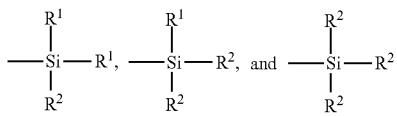

wherein R¹ is an alkyl group of 1 to 4 carbon atoms, cyclohexyl or phenyl; wherein R² is alkoxy group of 1 to 8 carbon atoms, cycloalkoxy group of 5 to 8 carbon atoms or an alkylmercapto group of 1 to 8 carbon atoms; wherein Alk is a divalent hydrocarbon of 1 to 18 carbon atoms; and wherein n is an integer of 2 to 8. It is indicated that such sulfur containing organosilicon compounds can be made by reacting aqueous solutions of various polysulfidic anions in saturated sodium chloride brine solutions with chloropropyltriethoxysilane (CPTES) supported on carbon black in the presence of a phase transfer catalyst.

Rubber formulations which include silica and a silica coupling agent will typically be mixed utilizing a thermomechanical mixing technique. More specifically, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The functionalized rubber, silica and sulfur containing organosilicon, and carbon black if used, are mixed in one or more non-productive mix stages. In any case, the sulfur vulcanizable rubber composition containing the silica coupling agent (such as a sulfur containing organosilicon compound), vulcanizable rubber, and generally at least part of the silica are subjected to a thermomechanical mixing step. The thermomechanical mixing step generally comprises a mechanical working in a mixer or extruder for a period of time suitable in order to produce a rubber temperature which is within the range of 140° C. to 190° C.

The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It is normally be more preferred for the rubber to reach a temperature which is within the range of about 155° C. to about 170° C. and to be maintained at said temperature for a period of time which is within the range of about 5 minutes to about 10 minutes.

The thermomechanical working step adds time, labor, energy requirements, equipment requirements, and cost to the rubber formulating procedure. To eliminate the need for such a thermomechanical working step pre-hydrophobated precipitated silica was developed. For instance, U.S. Pat. No. 7,687,107 describes a process for producing a chemically modified siliceous filler by contacting an acidic aqueous suspension of amorphous precipitated silica with a coupling agent to form an acidic aqueous suspension of chemically modified precipitated silica, optionally in the presence of a surfactant and/or a water miscible solvent, and recovering said chemically modified filler, which comprises: (A) providing an acidic aqueous suspension of amorphous precipitated silica having a pH of 2.5 or less; (B) contacting the precipitated silica with a coupling agent comprising a combination of: (a) bis(alkoxysilylalkyl)polysulfide and (b) non-sulfur organometallic compound(s), the weight ratio of (a) to (b) being at least 0.05:1, under conditions that result in essentially complete hydrolysis of any alkoxy groups associated with the coupling agent, thereby to produce chemically modified precipitated silica; (C) raising the pH of the acidic aqueous suspension of chemically modified precipitated silica to from 3.0 to 10 with acid neutralizing agent that does not adversely affect the chemically modified precipitated silica; and (D) separating chemically modified precipitated silica from the aqueous phase while retaining in the aqueous phase substantially all of any alcohol by-product produced by hydrolysis of alkoxy groups associated with the coupling agent, said chemically modified precipitated silica having (i) a carbon content of greater than 1 weight percent, (ii) a sulfur content of greater than 0.1 weight percent, (iii) a Silane Conversion Index of at least 0.3, and (iv) a Standard Tensile Stress at 300 percent elongation of at least 7.0 when incorporated into a vulcanized rubber composition. U.S. Pat. No. 7,704,552 describes a similar technique.

Pre-hydrophobated precipitated silica is commercially available from PPG Industries and is sold as Agilon® 400 performance silica. It is characterized by a CTAB surface area of 140 m²/g, a N₂ (BET-5) surface area of 75 m²/g, a SH weight of 0.5%, a carbon weight of 4.0%, a pH of 5.6, and a micro-granule physical form. Agilon® 400 also contains sodium sulfate (Na₂SO₄) as a residual salt.

The silica used as a reinforcing filler in rubber formulations can come from a wide variety of sources. For instance, agricultural products create waste materials such as rice hulls, rice straw, wheat chaff, and straw that are relatively high in siliceous content. These waste materials are useful industrially for numerous applications if their carbon content is removed to produce an ash having a predominantly amorphous silica content with less than 3% carbon. Rice hulls are an example of such waste materials that can be treated to produce amorphous silica having a low carbon contain. Accordingly, the use of rice hull ash silica in rubber formulation is desirable because it make good use of a valueless waste material. United States Patent Application Publication No. 2002/0081247 describes a method of making amorphous silica ash from waste materials including rice hull. This method includes the steps of: feeding exothermic siliceous material into a mixing zone for eventual discharge through an ash outlet; creating a gas stream consisting of inner and outer vortices about a common axis and containing sufficient oxygen for exothermic combustion of the feed material, the vortices meeting in the mixing zone to carry the feed material axially in the inner vortex with a centrifugal force component to cause the material to move outwardly from the inner vortex into the outer vortex so that the material is entrapped in the gas stream and passed repeatedly through the mixing zone until the feed material is converted primarily to amorphous silica ash having escape criteria needed to remain in the inner vortex to carry the ash to ash outlet for passage through the ash outlet; collecting spent gas at a spent gas outlet; monitoring the temperatures in the gas stream; comparing the temperatures in the gas stream with known information to provide an output signal; and using the output signal to control the maximum temperatures in the gas stream to result in a predominantly amorphous silica ash. U.S. Pat. No. 7,585,481 describes a similar process for producing amorphous silica ash from rice hull ash.

Other techniques can also be used in making pre-hydrophobated precipitated silica on a commercial basis. In most cases this involves a three step process. The first step is a precipitation step wherein sodium silicate solution (water glass) is reacted to produce a slurry of amorphous silica particles. In most cases the silica coupling agent is added during or immediately after the precipitation step. At this point the concentration of silica is about 5 to 6 weight percent. Then the treated precipitated silica slurry is concentrated into a filter cake. As the final step of the process the silica filter cake is dried, typically by spray drying, which affects the final filler morphology and brings the product moisture content to the desired level.

There is a continuing need for better uses for rice hull ash silica, such as in high performance tire tread compounds. There is also a continuing long felt need for better methods for making pre-hydrophobated precipitated silica which can be employed in making rubber formulations without the need for a thermomechanical mixing step. It would also be highly desirable for such a method to generate reduced levels of alcohol and to waste virtually none of the silica coupling agent utilized in the process.

SUMMARY OF THE INVENTION

The subject invention discloses an improved method for making pre-hydrophobated precipitated silica from rice hull ash silica. This process is highly efficient and incorporates virtually all of the silica coupling agent used in making the pre-hydrophobated precipitated silica into the final product.

The subject invention more specifically reveals a method for making pre-hydrophobated precipitated silica in an aqueous medium comprising: (1) dispersing silica, a phase transfer agent, and a silica coupling agent into water to make an aqueous silica slurry, wherein the silica is rice hull ash silica; (2) allowing the silica coupling agent to react with the silica to produce the pre-hydrophobated precipitated silica; and (3) recovering the pre-hydrophobated precipitated silica from the aqueous silica slurry. In one embodiment of this invention the phase transfer agent is methyl tributyl ammonium chloride.

The present invention also discloses a method for making pre-hydrophobated precipitated silica in an aqueous medium comprising: (1) dispersing silica into water under conditions of agitation to made an aqueous silica slurry; (2) adding a phase transfer agent to the aqueous silica slurry; (3) adding a silica coupling agent to the aqueous silica slurry; (4) maintaining the aqueous slurry at a temperature of at least 20° C. for a period of time which is sufficient for the silica coupling agent to react with the silica in the aqueous silica slurry to produce the pre-hydrophobated precipitated silica; and (5) recovering the pre-hydrophobated precipitated silica from the aqueous silica slurry. In one embodiment of this invention the reaction between the silica and the silica coupling agent is carried out in the presence of a catalyst, such as titanium triethanolaminato isopropoxide.

DETAILED DESCRIPTION OF THE INVENTION

Various commercially available silicas may be considered for use in the practice of this invention. Some representative examples of silica that can be used in the practice of this invention include, but is not limited to, silicas commercially available from PPG Industries under the Hi-Sil trademark, such as Hi-Sil® 210, Hi-Sil® 233 and Hi-Sil® 243, silicas available from Solvay, with, for example, designations of Zeosil®1085Gr, Zeosil®1115MP, Zeosil®1165MP, Zeosil® Premium and ZHRS®1200MP, and silicas available from Evonik Industries with, for example, designations Ultrasil® 5000GR, Ultrasil® 7000GR, Ultrasil® VN2, Ultrasil® VN3, and BV9000GR, and silicas available from Huber Engineered Materials with, for example, designations of Zeopol® 8745, and Zeopol® 8755LS.

It is preferred for the silica to be rice hull ash silica. Such rice hull ash silica can be made in accordance with the teachings of United States Patent Application Publication No. 2002/0081247 A1 or U.S. Pat. No. 7,585,481 B2. The teachings of United States Patent Application Publication No. 2002/0081247 A1 and U.S. Pat. No. 7,585,481 B2 are incorporated herein by reference for the purpose of disclosing methods for making rice hull ash silica that can be utilized in accordance with this invention.

The silica coupling agent will typically be a compound of the formula:

Z-Alk-S$_n$-Alk-Z  (I)

Z-Alk-S$_n$-Alk  (II)

Z-Alk-SH  (III)

Z-Alk  (IV)

Si(OR$^1$)$_4$  (V)

in which Z is selected from the group consisting of:

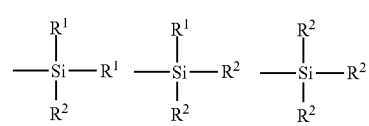

wherein R$^1$ is an alkyl group containing from 1 to 4 carbon atoms, a cyclohexyl group, or a phenyl group; wherein R$^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8. The mercaptosilanes and blocked mercaptosilanes that can be used in the practice of this invention are described in International Patent Publication Number WO 2006/076670. The teachings of WO 2006/076670 are incorporated herein by reference for the purpose of describing specific mercaptosilanes and blocked mercaptosilanes that can be used in the practice of this invention. The teachings of WO 03091314 are also incorporated herein by reference for the purpose of describing specific silanes that can be utilized in the practice of this invention which emit low levels of volatile organic compounds or no volatile organic compounds.

Specific examples of sulfur containing organosilicon compounds which may be used as the silica coupling agent in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide, (3-mercaptopropyl) trimethoxysilane, (3-Mercaptopropyl)triethoxysilane, and 3-(triethoxysilyl)propyl thiooctanoate.

The preferred sulfur containing organosilicon compounds are the 3,3'-bis(trimethoxy or triethoxy silylpropyl) sulfides.

The most preferred compound is 3,3'-bis(triethoxysilylpropyl) tetrasulfide. Therefore, with respect to formula I, Z is preferably

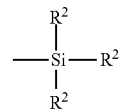

wherein $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the silica coupling agent that should be incorporated into the elastomeric compositions of this invention will vary depending on the level of the siliceous fillers that are included in the rubbery composition. Generally speaking, the amount of the silica coupling agent used will range from about 0.01 to about 15 parts by weight per hundred parts by weight of silica filler. Preferably, the amount of silica coupling agent utilized will range from about 1 to about 12 parts by weight per hundred parts by weight of the siliceous filler. More preferably, the amount of silica coupling agent utilized will range from about 2 to about 10 parts by weight per hundred parts by weight of the siliceous filler. Most preferably the amount of the silica coupling agent included in the elastomeric compositions of this invention will range from about 6 to about 10 parts by weight per hundred parts by weight of the siliceous filler.

The aqueous silica slurry made in accordance with this invention will normally contain from about 5 weight percent to about 25 weight percent silica, based upon the total weight of the aqueous slurry. The aqueous silica slurry will typically contain silica at a level which is within the range of about 7 weight percent to about 20 weight percent and which is preferably within the range of about 8 weight percent to about 12 weight percent.

The phase transfer agent will normally be employed in the aqueous slurry at a level which is within the range of about 0.1 phf to 8 phf (parts by weight per 100 parts by weight of silica filler). More typically, the phase transfer agent will normally be employed in the aqueous slurry at a level which is within the range of about 0.5 phf to 5 phf. The phase transfer agent will normally preferably be employed in the aqueous slurry at a level which is within the range of about 0.8 phf to 4 phf, and will more preferably be utilized at a level which is within the range of 1 phf to 3 phf. Phase transfer agents which can be utilized in accordance with this invention are described in U.S. Pat. No. 5,663,396. The teachings of U.S. Pat. No. 5,663,396 are incorporated by reference herein for the purpose of describing such phase transfer agents. Methyl tributyl ammonium chloride (MT-BAC) is a highly preferred phase transfer agent for use in the practice of this invention.

After the aqueous slurry is made the silica coupling agent is allowed to react with the silica at a temperature and for a time which is sufficient to allow for the silica coupling agent to react with the silica. This temperature will normally be at least about 20° C. In most cases a temperature which is within the range of 20° C. to 100° C. will be utilized. The reaction temperature will normally be within the range of 40° C. to 80° C. with temperatures within the range of 60° C. to 75° C. being most preferred.

It is preferred for a catalyst to be present to facilitate the reaction between the silica and the silica coupling agent. It is preferred for the catalyst to be a titanium alkoxide, such as titanium triethanolaminato isopropoxide (TI). The catalyst will normally be present in the aqueous silica slurry at a level which is within the range of 0.1 phf to 4 phf. The catalyst will typically be present in the aqueous silica slurry at a level which is within the range of 0.4 phf to 2 phf and will preferably be present at a level which is within the range of 0.6 phf to 1.4 phf.

After the silica coupling agent has been allowed to react with the silica in the aqueous silica slurry the pre-hydrophobated precipitated silica made is recovered from the slurry. This is accomplished by simply removing the water from the silica product. It is normally preferred to recover the pre-hydrophobated precipitated silica by spray drying.

This invention is illustrated by the following examples which are merely for the purpose of illustration and are not to be regarded as limiting the scope of the invention or the manner in which it can be practiced. Unless specifically indicated otherwise, parts and percentages are given by weight.

COMPARATIVE EXAMPLES 1 & 2 AND EXAMPLES 3 & 4

In this experiment 100 grams of silica was put in a beaker. Then, 900 grams of deionized water was introduced and mixing was initiated. The silica slurry was mixed for 30 minutes at room temperature. Then, 2 grams of methyl tributyl ammonium chloride (MTBAC) was added to the system and mixing was continued for an additional 60 minutes. After that, either Si266 or Si69 was added as a silica coupling agent. Then, 8 grams (8 phf) of the silica coupling agent (either Si266 or Si69) was added. The samples were mixed for an additional 60 minutes. Finally, 1 gram of titanium triethanolaminato isopropoxide (TI) was added and the system was mixed for another 60 minutes. The samples were then placed in pans to start the drying process. After most of the water was removed, the silica samples were broken up with a mortar and pestle and returned for drying.

The pre-hydrophobated precipitated silica samples made were then evaluated in rubber formulations made in non-productive and productive mixing stages. These rubber formulations included the constituents listed in Table 1.

TABLE 1

Evaluation Rubber Formulation

|  | 2 minutes @ 160° C. or drop @ 160° C. |
|---|---|
| Non-Productive | |
| Functionalized Styrene-Butadiene Rubber | 70 phr |
| Budene ® 1207 High Cis-1,4-Polybutadiene Rubber | 30 phr |
| N330 Carbon Black | 3 phr |
| Microcrystalline Wax | 1.0 phr |
| Antioxidant | 2.0 phr |
| Stearic Acid | 3.0 phr |
| Silica + Coupling Agent or Pretreated Silica | 70 phr + 5.6 phr 72 phr |
| Naphthenic Processing Oil | 20 phr |
| Productive | |
| Zinc Oxide | 1.5 phr |
| Sulfur | 1.4 phr |
| Accelerator | 1.4 phr |
| Diphenyl Guanidine | 2.1 phr |
| Antioxidant | 0.7 phr |

A list of the important ingredients/parameters is presented in Table 2. Pretreated silica samples were prepared with Si266 or Si69 at a level of 8 phf (parts by weight per 100 parts by weight of filler). In addition, a control sample was generated with silica passed through the process with no chemicals added. A second control was generated where methyl tributyl ammonium chloride was utilized as a phase transfer agent and a third control with the methyl tributyl ammonium chloride phase transfer agent and titanium triethanolaminato isopropoxide catalyst being utilized. The mixing was performed on a 360 cc Haake mixer. The mixer was set at 100° C. and the initial rotor speed was at 120 rpm. For the pretreated silica 72 phr of silica were used instead of 70+5.6 phr of the neat silica and coupling agent. This reduced value would account for the condensation of silane, the release of ethanol and reduction in water content of the silica.

TABLE 2

Ingredients/Parameters

| Example | C1 | C2 | 3 | 3 |
|---|---|---|---|---|
| Silica | Neat | Neat | Si266 Pretreated | Si266 Pretreated |
| Coupling Agent | 8 phf Si266 | 8 phf Si69 | 8 phf Si266 | 8 phf Si69 |
| Silanization | In Situ | In Situ | Pretreated | Pretreated |
| Mixing/Heat Treatment | 2 m @160° C. | 2 m @160° C. | Drop @ 160° C. | Drop @ 160° C. |
| Silica | 70 phr | 70 phr | | |
| Si266 | 5.6 phr | | | |
| Si69 | | 5.6 phr | | |
| Pretreated Si266 | | | 72 phr | |
| Pretreated Si69 | | | | 72 phr |

The results of rheometer testing is provided in Table 3. It was noted that all samples processed similarly. The introduction of the titanium triethanolaminato isopropoxide catalyst (TI) did increase the on-set of the cure slightly. One thing to note is that the two pretreated samples with coupling agent mixed for only about 2 minutes (after ingredient loading) while the in-situ heat treated samples were mixed for about 2 minutes plus the heat treatment protocol.

TABLE 3

Rheometer Testing Results

| Example | C1 | C2 | 3 | 4 |
|---|---|---|---|---|
| G' @ 0.833 Hz | 205 kPa | 241 kPa | 202 kPa | 206 kPa |
| Tan δ @ 0.833 Hz | 0.758 | 0.668 | 0.794 | 0.727 |
| S'(MH)-S' (ML) | 10.0 dNm | 10.8 dNm | 11.7 dNm | 11.7 dNm |
| Time @ 25% cure S' | 2.6 min | 2.6 min | 1.9 min | 1.9 min |
| Time @ 90% cure S' | 5.6 min | 5.9 min | 4.3 min | 4.6 min |

The RPA cured properties of the rubber samples are reported in Table 4. As can be seen, the pretreated silica with Si266 and Si69 silica coupling agents performed in an essentially equivalent manner to the in-situ treated samples where a heat treatment protocol of 2 minutes at 160° C. was used. In comparing the pretreated control sample it was noted that it also closely tracked the RPA properties of the in-situ sample treated for 2 minutes at 60° C.

TABLE 4

RPA Data

| Example | C1 | C2 | 3 | 4 |
|---|---|---|---|---|
| First Strain Sweep | | | | |
| G' @ 1.000% | 2740 kPa | 2710 kPa | 3154 kPa | 2904 kPa |
| G' @ 10.000% | 1820 kPa | 1943 kPa | 2039 kPa | 2008 kPa |
| Tan δ @1.000% | 0.128 | 0.104 | 0.124 | 0.104 |

The Rebound values reported in Table 5 and the Metravib results shown in Table 6 tell a similar story. The pretreated samples performed very close to or better than the samples treated for 2 minutes at 160° C. The increased heat treatment at 160° C. for 5 minutes gave the best properties with respect to tire rolling resistance indicators. However, switching to a higher temperature of 170° C. for 5 minutes deteriorated the properties. The silica that was passed through the treatment protocol without the addition of any chemicals performed equal to the neat sample that was heat treated for 2 minutes at 160° C. The silica sample that was treated with MTBAC and TI gave significantly improved properties as compared to the neat silica. Results at sub-ambient temperatures (0° C. and −20° C.) did not show significant differences.

TABLE 5

Rebound Values

| Example | C1 | C2 | 3 | 4 |
|---|---|---|---|---|
| Rebound @ 0° C. | 11.6% | 11.5% | 12.4% | 11.9% |
| Rebound @ 20° C. | 44% | 50.4% | 46.4% | 51.5% |
| Rebound @ 60° C. | 62.1% | 66.8% | 62.2% | 66% |

TABLE 6

Metravib Results

| Example | C1 | C2 | 3 | 4 |
|---|---|---|---|---|
| G' @−20° C. | $6.5 \times 10^6$ | $6.3 \times 10^6$ | $7.3 \times 10^6$ | $6.5 \times 10^6$ |
| Tan δ @ 0° C. | 0.305 | 0.281 | 0.297 | 0.266 |
| Tan δ @ 30° C. | 0.192 | 0.148 | 0.182 | 0.145 |
| Tan δ @ 60° C. | 0.152 | 0.114 | 0.146 | 0.112 |

Tensile results are reported in Table 7. It should be noted that for most of the properties the values are close. The one property that does show a significant difference is the elongation at break. Here there is a decrease observed for all samples that went through the treatment process. However, this probably resulted from the drying protocol utilized and would probably not be significant in cases where spray drying procedures are implemented.

TABLE 7

Tensile Properties

| Example | C1 | C2 | 3 | 4 |
|---|---|---|---|---|
| Modulus @ 100% | 2.3 MPa | 2.8 MPa | 2.6 MPa | 2.8 MPa |
| Modulus @ 300% | 9.4 MPa | 13.1 MPa | 10.4 MPa | 13.6 MPA |
| Tensile Stress @ Max | 14.9 MPa | 15.1 MPa | 13.1 MPA | 12.8 MPa |
| Elongation @ Break | 410% | 332% | 352% | 290% |

Abrasion characteristics are reported in Table 8. As can be seen, the samples which were pretreated with a coupling agent performed worse than the in-situ heat treated samples. In fact, the pretreated samples perform close to the in-situ heat treated sample where the temperature was dropped at 160° C. The mixing of these samples was similar. Of course, as for the tensile results the drying protocol could have played a role but especially for the DIN results the indication is that it is mostly the mixing that influences it. It appears that the DIN properties are plateauing after a set of MEQ values have been introduced in the compounds.

TABLE 8

| | DIN Abrasion | | | |
|---|---|---|---|---|
| Example | C1 | C2 | 3 | 4 |
| DIN Rating | 100 | 102 | 93 | 90 |

While certain representative embodiments and details have been shown for the purpose of illustrating the subject invention, it will be apparent to those skilled in this art that various changes and modifications can be made therein without departing from the scope of the subject invention.

What is claimed is:

1. A method for making pre-hydrophobated precipitated silica in an aqueous medium comprising: (1) dispersing silica, a phase transfer agent, and a silica coupling agent into water to make an aqueous silica slurry, wherein the silica is rice hull ash silica and wherein the phase transfer agent is methyl tributyl ammonium chloride; (2) allowing the silica coupling agent to react with the silica to produce the pre-hydrophobated precipitated silica; and (3) recovering the pre-hydrophobated precipitated silica from the aqueous silica slurry.

2. The method of claim 1 wherein the silica coupling agent is allowed to react with the silica at a temperature which is within the range of 20° C. to 100° C. for a period of time which is sufficient for the silica coupling agent to react with the silica to produce the pre-hydrophobated precipitated silica.

3. The method of claim 1 wherein the silica coupling agent is allowed to react with the silica at a temperature which is within the range of 60° C. to 75° C. for a period of time which is sufficient for the silica coupling agent to react with the silica to produce the pre-hydrophobated precipitated silica.

4. The method of claim 1 wherein the silica is present in the aqueous silica slurry at a level which is within the range of about 5 weight percent to about 25 weight percent.

5. The method of claim 1 wherein the silica is present in the aqueous silica slurry at a level which is within the range of about 7 weight percent to about 20 weight percent.

6. The method of claim 1 wherein the silica is present in the aqueous silica slurry at a level which is within the range of about 8 weight percent to about 12 weight percent.

7. The method of claim 1 wherein the phase transfer agent is present in the aqueous silica slurry at a level which is within the range of about 0.1 phf to 8 phf.

8. The method of claim 1 wherein the phase transfer agent is present in the aqueous silica slurry at a level which is within the range of about 0.5 phf to 5 phf.

9. The method of claim 1 wherein the phase transfer agent is present in the aqueous silica slurry at a level which is within the range of about 1 phf to 3 phf.

10. The method of claim 1 wherein silica coupling agent is a compound of the formula:

wherein Z is selected from the group consisting of:

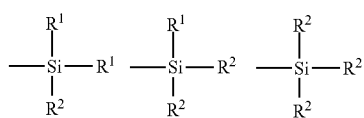

wherein $R^1$ is an alkyl group containing from 1 to 4 carbon atoms, a cyclohexyl group, or a phenyl group; wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8.

11. The method of claim 1 wherein silica coupling agent is selected from the group consisting of 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide, (3-Mercaptopropyl) trimethoxysilane, (3-Mercaptopropyl)triethoxysilane and 3-(Triethoxysilyl)propyl thiooctanoate.

12. The method of claim 1 wherein the pre-hydrophobated precipitated silica is recovered from the aqueous silica slurry by spray drying.

13. The method of claim 1 wherein a catalyst is further included in the aqueous silica slurry and wherein the catalyst is a titanium alkoxide.

14. The method of claim 13 wherein the catalyst is present at a level which is within the range of 2 phf to 4 phf.

15. The method of claim 14 wherein the catalyst is titanium triethanolaminato isopropoxide.

16. A method for making pre-hydrophobated precipitated silica in an aqueous medium comprising: (1) dispersing silica, a phase transfer agent, and a silica coupling agent into water to make an aqueous silica slurry, wherein the aqueous silica slurry consists essentially of the silica, the phase transfer agent, the silica coupling agent, optionally a catalyst, and water, wherein the silica is rice hull ash silica and wherein the phase transfer agent is methyl tributyl ammonium chloride; (2) allowing the silica coupling agent to react with the silica at a temperature which is within the range of 20° C. to 100° C. to produce the pre-hydrophobated precipitated silica; and (3) recovering the pre-hydrophobated precipitated silica from the aqueous silica slurry.

17. The method of claim 16 wherein the aqueous silica slurry consists of the silica, the phase transfer agent, the silica coupling agent, optionally a catalyst, and water.

18. The method of claim 17 wherein a catalyst is included in the aqueous silica slurry and wherein the catalyst is titanium triethanolaminato isopropoxide.

19. The method of claim 18 wherein the silica is present in the aqueous silica slurry at a level which is within the range of about 5 weight percent to about 25 weight percent, wherein the phase transfer agent is present in the aqueous silica slurry at a level which is within the range of about 0.1 phf to 8 phf, and wherein the catalyst is present at a level which is within the range of 2 phf to 4 phf.

20. A method for making pre-hydrophobated precipitated silica in an aqueous medium comprising: (1) dispersing silica, a phase transfer agent, a catalyst, and a silica coupling agent into water to make an aqueous silica slurry, wherein the silica is rice hull ash silica, wherein the phase transfer agent is methyl tributyl ammonium chloride, and wherein the catalyst is titanium triethanolaminato isopropoxide; (2) allowing the silica coupling agent to react with the silica at a temperature which is within the range of 20° C. to 100° C. to produce the pre-hydrophobated precipitated silica; and (3) recovering the pre-hydrophobated precipitated silica from the aqueous silica slurry.

* * * * *